United States Patent [19]
Kohler et al.

[11] 3,865,124
[45] Feb. 11, 1975

[54] FRICTION REDUCTION

[75] Inventors: Jacques R. Kohler; Gerrit J. Van Amerongen, both of Amsterdam, Netherlands

[73] Assignee: Shell Oil Co., Houston, Tex.

[22] Filed: June 14, 1974

[21] Appl. No.: 479,400

[30] Foreign Application Priority Data
June 18, 1973  Great Britain................... 28860/73

[52] U.S. Cl..................................... 137/13, 252/59
[51] Int. Cl............................................. F17d 1/16
[58] Field of Search ......... 137/13; 166/308; 252/59, 252/8.55; 44/62, 80

[56] References Cited
UNITED STATES PATENTS
3,687,148   8/1972   Kruka................................... 137/13
3,776,247   12/1973   Choufoer............................. 137/13

*Primary Examiner*—Alan Cohan
*Attorney, Agent, or Firm*—Fredrik Marlowe

[57] ABSTRACT

The frictional drag of hydrocarbons flowing in conduits is reduced by the addition of a cyclopentene polymer thereto.

10 Claims, No Drawings

FRICTION REDUCTION

BACKGROUND OF THE INVENTION

It is known that the transport of hydrocarbon oils through pipelines requires considerable amounts of pumping energy to overcome the frictional drag of the liquid, in particular when the oils have a high viscosity, such as crude oil, residual oil or a heavy distillate fraction, such as gas oil. The frictional losses become apparent as a pressure drop in the pipeline, as the oils are pumped through it under conditions of turbulent flow.

It is known to employ polymer additives to reduce frictional losses during flow of hydrocarbon oils through pipelines or other conduits. Thus, U.S. Pat. No. 3,215,154 and 3,493,000 describe the use of polybutadiene, polyisoprene and polyisobutene for this purpose.

One of the problems associated with the use of polymer additives for reducing frictional drag in hydrocarbon oils is that many polymers are liable to degradation when subjected to the high shear stresses which are encountered when the oils are being transported through pipelines under conditions of high velocity for some length of time. This degradation, which is assumed to result from scission of the carbon-to-carbon linkages in the polymer chain or backbone leads to the formation of lower molecular weight products, which do not possess the desirable drag-reducing characteristics of the original, undegraded polymers.

SUMMARY OF THE INVENTION

It has now been found that polymers and copolymers of cyclopentene are very effective and shear-resistant additives for reducing frictional losses in flowing hydrocarbon oils.

Thus, the present invention relates to hydrocarbon oil compositions having reduced frictional drag when flowing through pipelines or other conduits, which compositions comprise a hydrocarbon base oil and a minor proportion of a polymer or copolymer of cyclopentene.

DESCRIPTION OF PREFERRED EMBODIMENTS

The preparation of the cyclopentene polymers, which are also used as elastomers, is described, inter alia, in U.K. Pat. 1,010,860, 1,035,282 and 1,062,367. The preparation of copolymers of cyclopentene and small proportions of other ethylenically unsaturated hydrocarbons such as isobutene, n-octene, butadiene and isoprene is the subject of U.K. Pat. 1,098,340 and German Pat. application 1,945,358.

The polymers or copolymers used in the process according to this invention preferably have a molecular weight of between $5.10^5$ and $10^7$. Preference is given to the polymers and copolymers having a molecular weight of between $10^6$ and $5.10^6$.

The proportion of the additive used in the present process is preferably between 5 and 800 parts per million (mass), in particular between 10 and 100 ppm (mass).

The compositions according to the invention can be transported through pipelines using a lower pumping energy, and thus at lower cost, than the corresponding base oils without the cyclopentene polymer or copolymer.

The compositions can also be used as fluids in well-working operations, in particular as well-fracturing fluid.

EXAMPLE

Compositions were prepared, using as a base oil a straightrun gas oil, made from Kuwait crude oil, and as drag-reducing additives different proportions of five homopolymers of cyclopentene, having intrinsic viscosities (I.V.) (toluene, 25°C) between 9.4 and 23.5 dl/g.

The compositions were subjected to heavy shear stress and the drag-reducing offset was measured both before and after the shearing operation. The shearing operation was carried out by forcing the oils through a nozzle having an internal diameter of 0.5 mm, applying a pressure drop over the nozzle of 1.5 kg/cm².

The results are summarized in Table I.

TABLE I

| | (polycyclopentene) | | | | |
|---|---|---|---|---|---|
| Exp. No. | I.V. dl/g | Mol. wt. $\times 10^{-6}$ | Concentration ppm (wt) | Drag reduction % Before Shear | After Shear |
| 1 | 9.4 | 1.13 | 100 | 21 | 18 |
| 2 | 13 | 1.7 | 10 | 19 | 13 |
| 3 | 13 | 1.7 | 100 | 20 | 20 |
| 4 | 18 | 2.5 | 10 | 24 | 20 |
| 5 | 21 | 3.1 | 10 | 25 | 23 |
| 6 | 23.5 | 3.5 | 10 | 25 | 23 |

In Table II it is shown that the present polymers are superior to known drag reducers, namely polyisoprene (same conditions as for Table I) as to shear stability.

TABLE II

| | (polyisoprene) | | | | |
|---|---|---|---|---|---|
| Exp. No. | I.V. dl/g | Mol. wt. $\times 10^{-6}$ | Concentration ppm (wt) | Drag reduction % Before Shear | After Shear |
| 1 | 21 | 7.9 | 10 | 23 | 14 |
| 2 | 24 | 9.5 | 10 | 25 | 19 |
| 3 | 27.5 | 11.5 | 10 | 23 | 16 |

We claim as our invention:

1. A hydrocarbon composition having reduced frictional drag when flowing through pipelines or other conduits comprising a hydrocarbon and a minor proportion of a polymer or copolymer of cyclopentene.
2. A composition according to claim 1 wherein the polymer or copolymer has a molecular weight of between $5.10^5$ and $10^7$.
3. A composition according to claim 2 wherein said molecular weight is between $10^6$ and $5.10^6$.
4. A composition according to claim 1 wherein the proportion of the polymer or copolymer to the hydrocarbon is between 5 and 200 parts per million.
5. A composition according to claim 4 wherein said proportion is between 10 and 100 parts per million.
6. A composition according to claim 1 wherein the hydrocarbon is a crude oil.
7. A composition according to claim 1 wherein the hydrocarbon is a gas oil.
8. A method for reducing frictional drag in the transportation of a hydrocarbon oil through a conduit which comprises adding a minor proportion of a polymer or copolymer of cyclopentene to the hydrocarbon.
9. The method of claim 8 wherein the hydrocarbon is a crude oil.
10. The method of claim 8 wherein the hydrocarbon is a gas oil.

* * * * *